United States Patent
Tran et al.

(10) Patent No.: US 9,200,095 B2
(45) Date of Patent: Dec. 1, 2015

(54) POLYPROPYLENE FOR FOAM AND POLYPROPYLENE FOAM

(75) Inventors: Anh Tuan Tran, Luftenberg (AT); Katja Klimke, Linz (AT); Hermann Braun, Linz (AT); Susana Filipe, Leonding (AT)

(73) Assignee: BOREALIS AG, Vienna (AT)

(*) Notice: Subject to any disclaimer, the term of this patent is extended or adjusted under 35 U.S.C. 154(b) by 128 days.

(21) Appl. No.: 14/112,364

(22) PCT Filed: Apr. 26, 2012

(86) PCT No.: PCT/EP2012/001806
§ 371 (c)(1),
(2), (4) Date: Feb. 12, 2014

(87) PCT Pub. No.: WO2012/150019
PCT Pub. Date: Nov. 8, 2012

(65) Prior Publication Data
US 2014/0163126 A1    Jun. 12, 2014

(30) Foreign Application Priority Data
May 2, 2011    (EP) ..................... 11003572

(51) Int. Cl.
| C08F 10/06 | (2006.01) |
| C08L 23/12 | (2006.01) |
| C08F 4/34 | (2006.01) |
| C08F 4/659 | (2006.01) |
| C08F 110/06 | (2006.01) |
| C08F 210/06 | (2006.01) |

(52) U.S. Cl.
CPC . *C08F 10/06* (2013.01); *C08F 4/34* (2013.01); *C08L 23/12* (2013.01); *C08F 4/65912* (2013.01); *C08F 110/06* (2013.01); *C08F 210/06* (2013.01); *C08L 2203/14* (2013.01); *C08L 2314/06* (2013.01)

(58) Field of Classification Search
CPC .......... C08F 10/06; C08F 4/34; C08F 110/06; C08F 210/06; C08F 4/65912; C08L 23/12; C08L 2203/14; C08L 2314/06
See application file for complete search history.

(56) References Cited

U.S. PATENT DOCUMENTS

| 6,512,019 B1 | 1/2003 | Agarwal et al. |
| 2001/0020045 A1 | 9/2001 | Tsutsui et al. |

FOREIGN PATENT DOCUMENTS

| DE | 3539352 | 5/1986 |
| EP | 0 887 379 | 12/2004 |
| EP | 1 741 725 | 1/2007 |
| EP | 1 900 764 | 3/2008 |
| EP | 1 939 230 | 7/2008 |
| EP | 2 000 504 | 12/2008 |
| WO | WO 92/12182 | 7/1992 |
| WO | WO 94/28034 | 12/1994 |
| WO | WO 97/08216 | 3/1997 |
| WO | WO 97/22633 | 6/1997 |
| WO | WO 01/48034 | 7/2001 |
| WO | WO 03/051934 | 6/2003 |
| WO | WO 2011/141070 A1 | 11/2011 |

OTHER PUBLICATIONS

International Search Report mailed May 29, 2012 for International application No. PCT/EP2012/001806.

*Primary Examiner* — Irina S Zemel
(74) *Attorney, Agent, or Firm* — Fay Sharpe LLP

(57) ABSTRACT

The present invention is concerned with a polypropylene composition comprising a polypropylene base resin, the polypropylene composition having—a XHU content of less than 1.25 wt. %;—a F30 melt strength of at least 30 cN, determined in the Rheotens test at 200° C.; and—a melt extensibility v30 of at least 200 m/s, determined in the Rheotens test at 200° C. In another aspect the present invention is concerned with a polypropylene composition having an MFR (2.16 kg, 230° C., ISO 1133) of 1.0 to 5.0 g/10 min comprising a polypropylene base resin, the polypropylene base resin being obtainable by producing an intermediate polypropylene having an MFR (2.16 kg, 230° C., ISO 1133) of 0.5 to 2.5 g/10 min in the presence of an asymmetric catalyst; mixing the intermediate polypropylene with peroxide and at least one diene at a temperature of 20 to 90° C. for at least 2 minutes to form a pre-mixed material; melt mixing the pre-mixed material in a melt mixing device at a barrel temperature in the range of 180 to 300° C., whereby the melt mixing device is a melt mixing device includes a feed zone, a kneading zone and a die zone, whereby an initial barrel temperature T1 is maintained in the feed zone, a barrel temperature T2 is maintained in the kneading zone and a die barrel temperature T3 is maintained in the die zone, whereby the barrel temperatures T1, T2, and T3 satisfy the following relation: T1<T3<T2. In yet another aspect the present invention is concerned with a process for the production of a polypropylene composition having—a XHU content of less than 1.25 wt. %;—a F30 melt strength of at least 30 cN, determined in the Rheotens test at 200° C.; and—a melt extensibility v30 of at least 200 m/s, determined in the Rheotens test at 200° C. whereby an asymmetric catalyst derived intermediate polypropylene having an MFR (2.16 kg, 230° C., ISO 1133) of 0.5 to 2.5 g/10 min is mixed with peroxide and at least one diene at a temperature of 20 to 90° C. for at least 2 minutes to form a pre-mixed material; and the pre-mixed material is melt mixed in a melt mixing device at a barrel temperature in the range of 180 to 300° C. In yet another aspect the present invention is concerned with foam comprising the polypropylene composition according to the present invention. The present invention is further concerned with the use of the polypropylene composition for producing foamed articles.

14 Claims, No Drawings

POLYPROPYLENE FOR FOAM AND POLYPROPYLENE FOAM

The present invention relates to polypropylene for foam and foam containing polypropylene as well as a process for producing the polypropylene and the foam.

BACKGROUND

Generally speaking, polyethylene has been successful in the field of foams since high pressure conditions lead to long chain branching, whereby the polyethylenes are characterized by high melt strength at considerably good processability. However, polyethylenes have various disadvantage and the application is severely limited. Polypropylene has very attractive properties such as high modulus, tensile strength, rigidity and heat resistance. However, the linear structure leads to poor processability making linear polypropylene unsuitable for numerous uses. Therefore, polypropylene for uses such as in foam is produced under conditions that result in long chain branching (LCB).

Thermoplastic foams posses a cellular structure generated by the expansion of a blowing agent. The cellular structure provides unique properties that enable the foamed plastics to be used for various industrial applications. Due to the attractive properties mentioned above and low material cost, polypropylene foams have been considered as a substitute for other thermoplastic foams in industrial applications. In particular, it can be expected to achieve higher rigidity compared to other polyolefins, higher strength than polyethylene and better impact strength than polystyrene. Furthermore, polypropylene allows a higher service temperature range and good temperature stability. However, polypropylene is suffering from some serious drawbacks, limiting its use for the preparation of foams. In particular, many polypropylenes have low melt strength and/or low melt extensibility.

Polypropylenes suitable for foam have been the object of various investigations in the past. Foam applications require high melt strength and at the same time good flow properties. The conventional and well known concepts for partially overcoming the drawbacks are use of high energy irradiation, treatment with peroxide, treatment with monomer/peroxide mixtures and solid phase treatment by subjecting polypropylene homo- or copolymer to a peroxide treatment in the presence of dienes.

Nevertheless, all these treatments result in various disadvantages. For example, the peroxide treatment in the presence of dienes leads to the formation of gels. Even worse, gel formation is usually increased when the extrusion screw speed reaches desirable industrial ranges. Other processes result in undesirably high crosslinking limiting the practical applicability of polypropylenes for foam.

Gel formation reflected by XHU usually results in undesirable low melt strength such as reflected by the F200 (cN) values. This problem is of high practical relevance since complete absence of gel formation cannot be achieved in industrial scale characterized by relatively high extrusion screw speeds.

Thus there is still the need for alternative or improved propylene polymer compositions being suitable for foam. Moreover, there is the need for propylene polymer compositions being suitable for foam having high melt strength and simultaneously low gel content also when extruded at high screw speed. Particularly, there is the need for a polypropylene polymer composition having high melt strength such as reflected by F200 (cN) even when containing low amounts of gels.

SUMMARY OF THE INVENTION

The present invention is based on the finding that the above object can be achieved by subjecting a polypropylene being made in the presence of a metallocene catalyst to a post reactor peroxide treatment in the presence of at least one conjugated or non-conjugated, linear or branched diene containing 4 to 20 carbon atoms.

The present invention insofar provides a polypropylene composition comprising a polypropylene base resin, the polypropylene composition having
 a XHU content as defined in the method section of less than 1.25 wt.-%;
 a F30 melt strength of at least 30 cN, determined in the Rheotens test at 200° C.; and
 a melt extensibility v30 of at least 200 m/s, determined in the Rheotens test at 200° C.

The present invention is further concerned with a process for the production of a polypropylene composition having
 a XHU content of less than 1.25 wt-%;
 a F30 melt strength of at least 30 cN, determined in the Rheotens test at 200° C.; and
 a melt extensibility v30 of at least 200 m/s, determined in the Rheotens test at 200° C.
whereby an asymmetric catalyst derived intermediate polypropylene having an MFR (2.16 kg, 230° C., ISO 1133) of 0.5 to 2.5 g/10 min is mixed with peroxide and a conjugated or non-conjugated, linear or branched diene at a temperature of 20 to 90° C. for at least 2 minutes to form a pre-mixed material; and the pre-mixed material is melt mixed in a melt mixing device at a barrel temperature in the range of 180 to 300° C.

The present invention is further concerned with a polypropylene composition having an MFR (2.16 kg, 230° C., ISO 1133) of 1.0 to 5.0 g/10 min comprising a polypropylene base resin, the polypropylene base resin being obtainable by
producing an intermediate polypropylene having an MFR (2.16 kg, 230° C., ISO 1133) of 0.5 to 2.5 g/10 min in the presence of an asymmetric catalyst;
mixing the intermediate polypropylene with peroxide and a conjugated or non-conjugated, linear or branched diene at a temperature of 20 to 90° C. for at least 2 minutes to form a pre-mixed material;
melt mixing the pre-mixed material in a melt mixing device at a barrel temperature in the range of 180 to 300° C., whereby the melt mixing device is a melt mixing device includes a feed zone, a kneading zone and a die zone, whereby an initial barrel temperature T1 is maintained in the feed zone, a barrel temperature T2 is maintained in the kneading zone and a die barrel temperature T3 is maintained in the die zone, whereby the barrel temperatures T1, T2, and T3 satisfy the following relation:

T1<T3<T2.

In yet another aspect the present invention is concerned with foam comprising the polypropylene composition according to the present invention.

The present invention is further concerned with the use of the polypropylene composition for producing foamed articles.

DEFINITIONS

The term "polypropylene composition" used herein denotes compositions consisting of a long chain branched polypropylene base resin in an amount of at least 96 wt.-% and additives in an amount of up to 4 wt.-% with respect to the total polypropylene composition.

The term "polypropylene base resin" as used herein denoted the entirety of polypropylene polymers in the composition.

The term intermediate polypropylene denotes a polypropylene used as intermediate starting material for the production of the polypropylene base resin.

The term "long chain branched polypropylene base resin" as used herein denotes long chain branched polypropylene polymers containing bridging units.

The term polypropylene polymer includes polypropylene homopolymers and polypropylene copolymers with a comonomer content of less than 5 mol-%.

Bridging units are units which originate from conjugated or non-conjugated, linear or branched dienes containing 4 to 20 carbon atoms.

The bridging units as a matter of definition shall not contribute to the comonomer content, i.e. the comonomer content of less than 5 mole.-% concerns the amount of comonomers other than propylene ignoring the amount of structural units derived from conjugated or non-conjugated, linear or branched dienes containing 4 to 20 carbon atoms. In other words, a long chain branched polypropylene containing monomers different from propylene only as bridging units shall be considered as a polypropylene homopolymer.

The "long chain branched polypropylene base resin" is a monophasic resin.

A monophasic resin denotes a resin having only one $T_g$ when being subjected to DSC.

Catalyst denotes the organo-metalic compound containing the reaction centre of the polymerisation.

Catalyst system denotes the mixture of the catalyst, the optional cocatalyst and the optional support.

"An asymmetric catalyst derived polypropylene" denotes a polypropylene having been produced in the presence of an asymmetric catalyst.

DETAILED DESCRIPTION

Unless explicitly stated to the contrary, in the following preferred features of all embodiments according to the present invention are described.

Furthermore, any combination of the preferred features described in the following is also within the scope of the present invention.

The present invention bears several unique advantages. The XHU gel content of the inventive polypropylene compositions is relatively low even when the polypropylene composition is extruded at high speed. Further it has been surprisingly found that the unique structure of the polypropylene composition yields a F200 melt strength which is independent from the XHU gel level over the range resulting from 0.10 to 0.30 wt.-% XHU.

The present invention insofar has overcome the melt strength-gel content dependency such as reflected by F200 and XHU. This enables a commercially attractive production rate by the possible high screw speeds.

The polypropylene base resin according to the present invention is either a polypropylene homopolymer or a polypropylene copolymer with a comonomer content of less than 5 mol-% with respect to the total polypropylene copolymer. A polypropylene copolymer with a comonomer content of less than 5 mol-% is usually a polypropylene random copolymer.

It is preferred that the polypropylene base resin is a homopolymer.

If however, the polypropylene base resin is a polypropylene copolymer the comonomer content preferably is below 4 mol-% more preferably below 2 mol-% and most preferably below 1 mol-%.

The comonomer(s), if present, preferably is/are selected from the group of ethylene and alpha olefins, more preferably ethylene and $C_4$ to $C_{12}$ alpha olefins, most preferably ethylene or butene.

The polypropylene composition according to the present invention preferably has an MFR (2.16 kg, 230° C., ISO 1133) of 1.0 to 5.0 g/10 min, more preferably 1.2 to 4.0 g/10 min, most preferably 1.5 to 3.5 g/10 min.

The polypropylene composition may contain additives in an amount of up to 4 wt.-%.

Additives are preferably selected from the group of modifiers and stabilizers, antistatic agents, lubricants, nucleating agents, foam nucleators and pigments and combinations thereof. Specifically, such additives include primary antioxidants like sterically hindered phenols and secondary antioxidants like phosphites, UV stabilizers like sterically hindered amines, acid scavengers, pigment, α-nucleating agents like sodium 2,2'-methylene-bis-(4,6-di-tert-butylphenyl) phosphate or β-nucleating agents like calcium pimelate, antistatic agents like glycerol monostearate, slip agents like oleamide and foam nucleators like talc.

The additives may be included during the polymerisation process or after the polymerisation by melt mixing.

It is however preferred that the modifiers do not lower the melting temperature of the composition.

It is particularly preferred that the polypropylene composition according to the present invention does not contain LDPE, recognizable by the absence of any melting points below 135° C. in DSC.

A very sensitive and at the same time simple characterization method being commonly used in the scientific literature is large amplitude oscillatory shear (LAOS). In this method a single excitation frequency is applied and the torque response is analysed. The non-linear response generates mechanical higher harmonics at (3, 5, 7, . . . ). Fourier Transform analysis allows recovery of intensities and phases. As the intensity of the higher harmonics decreases rapidly, which can lead to very low values of the 5$^{th}$ and higher harmonics, the ratio of the $$LAOS-NLF(500\%) = \left|\frac{G'_1}{G'_3}\right|$$

where $G_1'$—first order Fourier Coefficient $G_3'$—third order Fourier Coefficient with both coefficients being calculated from a measurement performed at 500% strain, provides the most reliable characterization of the polymer structure.

Preferably, the polypropylene composition according to the present invention has an MFR (2.16 kg, 230° C., ISO 1133) of at least 1.0 g/10 min and a LAOS−NLF(500%) of at least 7.0 defined as $$LAOS - NLF(500\%) = \left|\frac{G'_1}{G'_3}\right|$$

where $G_1'$—first order Fourier Coefficient
$G_3'$—third order Fourier Coefficient
with both coefficients being calculated from a measurement performed at 500% strain.

More preferably, the polypropylene composition according to the present invention has an MFR (2.16 kg, 230° C., ISO 1133) of at least 1.0 g/10 min and a LAOS−NLF(1000%) of at least 5.7 defined as $$LAOS - NLF(1000\%) = \left|\frac{G'_1}{G'_3}\right|$$

where $G_1'$—first order Fourier Coefficient
$G_3'$—third order Fourier Coefficient
with both coefficients being calculated from a measurement performed at 1000% strain.

The polypropylene base resin is present in an amount of at least 96 wt.-%, preferably at least 97 wt.-% and most preferably at least 98 wt.-% with respect to the total polypropylene composition. Most preferably, the polypropylene composition consists of the polypropylene base resin and additives. Preferably the additives are selected from antioxidants, acid scavengers, UV stabilizers, nucleating agents, slip agents, antistatic agents, pigments and combinations thereof.

The polypropylene composition according to the present invention is characterized by a polymer structure being mainly responsible for the benefits of the present invention, particularly by the nature of long chain branching which may be expressed by the strain hardening factor being defined as $$SHF = \frac{\eta_E^+(t, \dot{\epsilon})}{\eta_{LVE}^+(t)} = \frac{\eta_E^+(t, \dot{\epsilon})}{3\eta^+(t)}$$

wherein
$\eta_E^+(t,\dot{\epsilon})$ is the uniaxial extensional viscosity; and
$\eta_{LVE}^+(t)$ is three times the time dependent shear viscosity $\eta^+(t)$ in the linear range of deformation. The determination of the linear viscoelastic envelop in extension $\eta_{LVE}^+(t)$, is based on IRIS Rheo Hub 2008 requiring the calculation of the discrete relaxation time spectrum from the storage and loss modulus data (G', G" (ω)). Details about the method can be found in the experimental part. The strain hardening factor mainly reflects the degree of "dispersion" (heterogeneity) of the branches relative to the polymer backbone. Secondarily the strain hardening factor also provides information about the branching degree.

The polypropylene composition according to the present invention preferably has a strain hardening factor (SHF) of 6.0 to 12.0, preferably 6.3 to 11.0, more preferably 6.4 to 10.5 and most preferably 6.5 to 10.0 when measured at a strain rate of 3.0 s$^{-1}$ and a Hencky strain of 2.5.

Moreover, the polypropylene composition according to the present invention preferably has a strain hardening factor (SHF) of 3.6 to 8.0, preferably of 3.7 to 7.5, more preferably of 3.8 to 7.0, and most preferably 3.9 to 6.5 when measured at a strain rate of 1.0 s$^{-1}$ and a Hencky strain of 2.0.

It should be understood that the preferred strain hardening factors (SHF) as mentioned above can be present individually but also can be present in combination.

Yet another method of characterizing the structure of branched polypropylene is the Rheotens measurement. Branched polypropylene shows higher melt strength with increasing shear applied on the polymer such as during melt extrusion. This property is well-known as strain hardening. In the Rheotens test, the strain hardening behaviour of polymers is analysed by Rheotens apparatus (product of Göttfert, Siemensstr. 2, 74711 Buchen, Germany) in which a melt strand is elongated by drawing down with a defined acceleration. The haul-off force F in dependence of draw-down velocity v is recorded. The test procedure is performed at a temperature of 23° C. Further details are given in the experimental part.

The polypropylene composition according to the present invention further preferably has a F30 melt strength of 31 to 60 cN, more preferably 32 to 50 cN and most preferably 33 to 45 cN.

The melt extensibility v30 of the polypropylene composition according to the present invention is preferably in the range of 200 to 350 mm/s, more preferably in the range of 215 to 300 mm/s and most preferably in the range of 230 to 275 mm/s.

Both quantities, F30 melt strength and melt extensibility v30, are determined at 200° C. in the Rheotens melt strength test as described in the experimental part.

The polypropylene composition according to the present invention further preferably has a F200 melt strength of 8 to 30 cN, more preferably 9 to 25 cN and most preferably 15 to 23 cN.

The melt extensibility v200 is preferably in the range of 220 to 370 mm/s, more preferably in the range of 240 to 320 mm/s and most preferably in the range of 245 to 300 mm/s.

Both quantities, F200 melt strength and melt extensibility v200, are determined at 200° C. in the Rheotens melt strength test as described in the experimental part.

The polypropylene composition according to the present invention preferably has a melting temperature Tm in the range of 135 to 165° C., more preferably from 140 to 162° C. and most preferably from 150 to 161° C. High melting temperatures enable the provision of materials capable of withstanding steam sterilization. Higher melting temperatures can be achieved with polypropylene homopolymers and higher crystallinity.

It has now surprisingly been found that a relatively simple and inexpensive process can be used for preparing the polypropylene composition according to the present invention.

The present invention insofar provides a process for the production of a polypropylene composition whereby an asymmetric catalyst derived intermediate polypropylene having an MFR (2.16 kg, 230° C., ISO 1133) of 0.5 to 2.5 g/10 min is mixed with peroxide and at least one conjugated or non-conjugated, linear or branched diene at a temperature of 20 to 90° C. for at least 2 minutes to form a pre-mixed material; and the pre-mixed material is melt mixed in a melt mixing device at a barrel temperature in the range of 180 to 300° C.

The at least one conjugated or non-conjugated, linear or branched diene preferably contains 4 to 20 carbon atoms, more preferably 4 to 10 carbon atoms. Preferred dienes include isoprene, 2,3-dimethylbutadiene, 1,3-pentadiene, 1,3-hexadiene, 1,4 octadiene and butadiene. The most preferred diene is butadiene.

Unless explicitly stated to the contrary in the following the term "diene" denotes a diene as defined above.

Usually not more than three different dienes, preferably one diene is used in the process according to the invention.

In the process according to the present invention the asymmetric catalyst derived intermediate polypropylene is preferably mixed with 0.3 to 1.0 parts per weight (ppw) of peroxide per 100 parts per weight of intermediate polypropylene, more preferably in the presence of 0.4 to 0.7 parts per weight (ppw) of peroxide per 100 parts per weight of intermediate polypropylene. Even more preferably the asymmetric catalyst derived intermediate polypropylene is mixed with 0.3 to 1.0 parts per weight (ppw) of tert-butylperoxy isopropyl carbonate (CAS No. 2372-21-6) per 100 parts per weight of intermediate polypropylene, most preferably 0.4 to 0.7 parts per weight (ppw) of tert-butylperoxy isopropyl carbonate (CAS No. 2372-21-6) per 100 parts per weight of intermediate polypropylene.

Tert-butylperoxy isopropyl carbonate (CAS No. 2372-21-6) is commercially available as Trigonox® BPIC-C75 (Akzo Nobel, NL)—75% solution in mineral spirits.

Even more preferably, the asymmetric catalyst derived intermediate polypropylene is preferably mixed with the diene in a concentration of 0.3 to 2.0 parts per weight (ppw) of diene per 100 parts per weight of intermediate polypropylene, most preferably the polypropylene composition is obtainable by pre-mixing in the presence of butadiene in a concentration of 0.3 to 2.0 parts per weight (ppw) of butadiene per 100 parts per weight of intermediate polypropylene.

It should be understood that the addition of the diene and the peroxide may be achieved at once in the pre-mixing stage or may be split up in two additions, a first addition in the pre-mixing stage and a second addition in the melt-mixing stage. Complete addition of the diene and the peroxide in the pre-mixing stage is preferred.

The diene is preferably added and mixed in form of a masterbatch composition.

The intermediate polypropylene may have an MFR (2.16 kg, 230° C., ISO 1133) of preferably of 0.5 to 1.5 g/10 min, more preferably of 0.7 to 1.3 g/10 min.

It is essential that the whole process does not involve visbreaking, i.e. subjecting any intermediate product to peroxide treatment in the absence of a diene such as butadiene.

The intermediate polypropylene is pre-mixed with the diene and peroxide in a powder mixing device, like a horizontal mixer with paddle stirrer. The pre-mixing is usually carried out at a temperature of 20 to 90° C., preferably is carried out at a temperature of the polymer powder of 25 to 80° C., most preferably in the range of 30 to 75° C. The residence time of the polymer in the pre-mixing step is usually at least 2 min, preferably 5 to 30 minutes, more preferably 8 to 20 minutes.

The pre-mixed material is then melt-mixed at a barrel temperature of 180 to 300° C., preferably in a continuous melt mixing device like a single screw extruder, a co-rotating twin screw extruder or a co-kneader. The barrel temperature is preferably in the range of 200 to 280° C.

More preferably the melt mixing device includes a feed zone, a kneading zone and a die zone and a specific temperature profile is maintained along the screw of the melt-mixing device, having an initial temperature T1 in the feed zone, a maximum temperature T2 in the kneading zone and a final temperature T3 in the die zone, all temperatures being defined as barrel temperatures and fulfilling the following relation: $T1<T3<T2$.

Barrel temperature T1 (in the feed zone) is preferably in the range of 180 to 210° C. Barrel temperature T2 (in the kneading zone) preferably is in the range of 280 to 300° C. Barrel temperature T3 (in the die zone) preferably is in the range of 260 to 290° C.

The screw speed of the melt mixing device preferably is adjusted to a range from 150 to 800 rotations per minute (rpm).

Following the melt-mixing step, the resulting polymer melt is pelletized either in an underwater pelletizer or after solidification of one or more strands in a waterbath in a strand pelletizer.

The present invention is further concerned with a polypropylene composition having an MFR (2.16 kg, 230° C., ISO 1133) of 1.0 to 5.0 g/10 min comprising a polypropylene base resin, the polypropylene base resin being obtainable by producing an intermediate polypropylene having an MFR (2.16 kg, 230° C., ISO 1133) of 0.5 to 2.5 g/10 min in the presence of an asymmetric catalyst;

mixing the intermediate polypropylene with peroxide and at least one diene at a temperature of 20 to 90° C. for at least 2 minutes to form a pre-mixed material;

melt mixing the pre-mixed material in a melt mixing device at a barrel temperature in the range of 180 to 300° C., whereby the melt mixing device is a melt mixing device includes a feed zone, a kneading zone and a die zone, whereby an initial barrel temperature T1 is maintained in the feed zone, a barrel temperature T2 is maintained in the kneading zone and a die barrel temperature T3 is maintained in the die zone, whereby the barrel temperatures T1, T2, and T3 satisfy the following relation:

$T1<T3<T2$.

In one aspect of the present invention the polypropylene composition comprising the polypropylene base resin being obtainable by the process described above is characterized by a XHU content of less than 1.25 wt.-% and/or a F30 melt strength of at least 30 cN, determined in the Rheotens test at 200° C. and/or a melt extensibility v30 of at least 200 m/s, determined in the Rheotens test at 200° C.

Barrel temperature T1 (in the feed zone) is preferably in the range of 180 to 210° C. Barrel temperature T2 (in the kneading zone) preferably is in the range of 280 to 300° C. Barrel temperature T3 (in the die zone) preferably is in the range of 260 to 290° C.

The screw speed of the melt mixing device preferably is adjusted to a range from 150 to 800 rotations per minute (rpm).

The at least one conjugated or non-conjugated, linear or branched diene preferably contains 4 to 20 carbon atoms, more preferably 4 to 10 carbon atoms. Preferred dienes include isoprene, 2,3-dimethylbutadiene, 1,3-pentadiene, 1,3-hexadiene, 1,4 octadiene and butadiene. The most preferred diene is butadiene.

Unless explicitly stated to the contrary in the following the term "diene" denotes a diene as defined above.

Usually not more than three different dienes, preferably one diene is used in the process according to the invention.

The polypropylene composition according to the present invention is preferably obtainable by pre-mixing in the presence of 0.3 to 1.0 parts per weight (ppw) of peroxide per 100 parts per weight of intermediate polypropylene, more preferably in the presence of 0.4 to 0.7 parts per weight (ppw) of peroxide per 100 parts per weight of intermediate polypropylene. Even more preferably the polypropylene composition according to the present invention is obtainable by pre-mixing in the presence of 0.3 to 1.0 parts per weight (ppw) of tert-butylperoxy isopropyl carbonate (CAS No. 2372-21-6) per 100 parts per weight of intermediate polypropylene, most preferably 0.4 to 0.7 parts per weight (ppw) of tert-butylperoxy isopropyl carbonate (CAS No. 2372-21-6) per 100 parts per weight of intermediate polypropylene.

Tert-butylperoxy isopropyl carbonate (CAS No. 2372-21-6) being commercially available as Trigonox® BPIC-C75 (Akzo Nobel, NL)—75% solution in mineral spirits.

Even more preferably, the polypropylene composition is obtainable by pre-mixing in the presence of a diene in a concentration of 0.3 to 2.0 parts per weight (ppw) of diene per 100 parts per weight of intermediate polypropylene, most preferably the polypropylene composition is obtainable by pre-mixing in the presence of butadiene in a concentration of 0.3 to 2.0 parts per weight (ppw) of butadiene per 100 parts per weight of intermediate polypropylene.

It should be understood that the addition of the diene and the peroxide may be achieved at once in the pre-mixing stage or may be split up in two additions, a first addition in the pre-mixing stage and a second addition in the melt-mixing stage. Complete addition of the diene and the peroxide in the pre-mixing stage is preferred.

The diene is preferably added and mixed in form of a masterbatch composition.

The intermediate polypropylene is pre-mixed with the diene and peroxide in a powder mixing device, like a horizontal mixer with paddle stirrer. The pre-mixing is usually carried out at a temperature of 20 to 90° C., preferably is carried out at a temperature of the polymer powder of 25 to 80° C., most preferably in the range of 30 to 75° C. The residence time of the polymer in the pre-mixing step is usually at least 2 min, preferably 5 to 30 minutes, more preferably 8 to 20 minutes.

The intermediate polypropylene preferably has a 2-1 regio-inversion of above 0.1 mol-%, more preferably above 0.2 mol-% and most preferably above 0.3 mol-% when measured by means of $^{13}$C-NMR according to the methodology described by J. C. Randall in "Polymer sequence determination $^{13}$C NMR method", Academic Press 1977. The content of regioinversions is calculated on the basis of the relative concentrations of S(alpha,beta)+S(beta,beta) methylene sequences. Further details are given in the experimental part. The regioinversion mainly can be influenced by catalyst modification.

The intermediate polypropylene preferably has an MFR (2.16 kg, 230° C., ISO 1133) of 0.5 to 1.5 g/10 min, more preferably of 0.7 to 1.3 g/10 min.

It is essential that the whole process does not involve visbreaking, i.e. subjecting any intermediate product to peroxide treatment in the absence of a diene such as butadiene.

The intermediate polypropylene according to all embodiments of the present invention is preferably obtainable by a catalyst system comprising an asymmetric metallocene catalyst. According to one specific embodiment the catalyst system has a porosity of less than 1.40 ml/g, more preferably less than 1.30 ml/g and most preferably less than 1.00 ml/g. The porosity has been measured according to DIN 66135 (N2). In another preferred embodiment the porosity is below detection limit when determined with the method applied according to DIN 66135.

The catalyst system may further comprise an activator as a cocatalyst, as described in WO 03/051934, which is enclosed herein by reference.

An asymmetric metallocene catalyst according to this invention is a catalyst comprising at least two organic ligands which differ in their chemical structure.

Furthermore it is preferred, that the catalyst system has a surface area of less than 25 m$^2$/g, yet more preferred less than 20 m$^2$/g, still more preferred less than 15 m$^2$/g, yet still less than 10 m$^2$/g and most preferred less than 5 m$^2$/g. The surface area according to this invention is measured according to ISO 9277 (N2).

It is in particular preferred that the catalytic system according to this invention comprises an asymmetric catalyst, i.e. a catalyst as defined below. In a specific embodiment the porosity of the catalyst system is not detectable when applying the method according to DIN 66135 (N2) and has a surface area measured according to ISO 9277 (N2) less than 5 m$^2$/g.

Preferably, the asymmetric catalyst employed comprises an organo-metallic compound of a transition metal of group 3 to 10 or the periodic table (IUPAC) or of an actinide or lanthanide.

The asymmetric catalyst is more preferably of a transition metal compound of formula (I)

$$(L)_m R_n MX_q \quad (I)$$

wherein

M is a transition metal of group 3 to 10 or the periodic table (IUPAC), or of an actinide or lantanide, each X is independently a monovalent anionic ligand, such as σ-ligand, each L is independently an organic ligand which coordinates to M, R is a bridging group linking two ligands L, m is 2 or 3, n is 0 or 1, q is 1, 2 or 3, m+q is equal to the valency of the metal, and with the proviso that at least two ligands "L" are of different chemical structure.

Said asymmetric catalyst is preferably a single site catalyst (SSC).

In a more preferred definition, each "L" is independently (a) a substituted or unsubstituted cycloalkyldiene, i.e. a cyclopentadiene, or a mono-, bi- or multifused derivative of a cycloalkyldiene, i.e. a cyclopentadiene, which optionally bear further substituents and/or one or more hetero ring atoms from a Group 13 to 16 of the Periodic Table (IUPAC); or (b) an acyclic, η$^1$- to η$^4$- or η$^6$-ligand composed of atoms from Groups 13 to 16 of the Periodic Table, and in which the open chain ligand may be fused with one or two, preferably two, aromatic or non-aromatic rings and/or bear further substituents; or (c) a cyclic σ-, η$^1$- to η$^4$- or η$^6$-, mono-, bi- or multidentate ligand composed of unsubstituted or substituted mono-, bi- or multicyclic ring systems selected from aromatic or non-aromatic or partially saturated ring systems and containing carbon ring atoms and optionally one or more heteroatoms selected from Groups 15 and 16 of the Periodic Table.

The term "σ-ligand" is understood in the whole description in a known manner, i.e. a group bonded to the metal at one or more places via a sigma bond. A preferred monovalent anionic ligand is halogen, in particular chlorine (Cl$^-$).

In a preferred embodiment, the asymmetric catalyst is preferably of a transition metal compound of formula (I)

$$(L)_m R_n MX_q \quad (I)$$

wherein

M is a transition metal of group 3 to 10 or the periodic table (IUPAC), or of an actinide or lantanide, each X is independently a monovalent anionic ligand, such as σ-ligand, each L is independently an organic ligand which coordinates to M, wherein the organic ligand is an unsaturated organic cyclic ligand, more preferably a substituted or unsubstituted, cycloalkyldiene, i.e. a cyclopentadiene, or a mono-, bi- or multifused derivative of a cycloalkyldiene, i.e. a cyclopentadiene, which optionally bear further substituents and/or one or more hetero ring atoms from a Group 13 to 16 of the Periodic Table (IUPAC),
R is a bridging group linking two ligands L,
m is 2 or 3,
n is 0 or 1,
q is 1, 2 or 3,
m+q is equal to the valency of the metal, and
with the proviso that at least two ligands "L" are of different chemical structure.

According to a preferred embodiment said asymmetric catalyst compound (I) is a group of compounds known as metallocenes. Said metallocenes bear at least one organic ligand, generally 1, 2 or 3, e.g. 1 or 2, which is η-bonded to the metal, e.g. a $\eta^{2-6}$-ligand, such as a $\eta^5$-ligand. Preferably, a metallocene is a Group 4 to 6 transition metal, more preferably zirconium, which contains at least one $\eta^5$-ligand.

Preferably the asymmetric catalyst compound has a formula (II):

$$(Cp)_m R_n MX_q \qquad (II)$$

wherein
M is Zr, Hf or Ti, preferably Zr
each X is independently a monovalent anionic ligand, such as 6-ligand,
each Cp is independently an unsaturated organic cyclic ligand which coordinates to M,
R is a bridging group linking two ligands L,
m is 2,
n is 0 or 1, more preferably 1,
q is 1, 2 or 3, more preferably 2,
m+q is equal to the valency of the metal, and
at least one Cp-ligand, preferably both Cp-ligands, is(are) selected from the group consisting of unsubstituted cyclopenadienyl, unsubstituted indenyl, unsubstituted tetrahydroindenyl, unsubstituted fluorenyl, substituted cyclopentadienyl, substituted indenyl, substituted tetrahydroindenyl, and substituted fluorenyl,
with the proviso in case both Cp-ligands are selected from the above stated group that both Cp-ligands must chemically differ from each other.

Preferably, the asymmetric catalyst is of formula (II) indicated above,
wherein
M is Zr
each X is Cl,
n is 1, and
q is 2.

Preferably both Cp-ligands have different residues to obtain an asymmetric structure.

Preferably, both Cp-ligands are selected from the group consisting of substituted cyclopentadienyl-ring, substituted indenyl-ring, substituted tetrahydroindenyl-ring, and substituted fluorenyl-ring wherein the Cp-ligands differ in the substituents bonded to the rings.

The optional one or more substituent(s) bonded to cyclopentadienyl, indenyl, tetrahydroindenyl, or fluorenyl may be independently selected from a group including halogen, hydrocarbyl (e.g. $C_1$-$C_{20}$-alkyl, $C_2$-$C_{20}$-alkenyl, $C_2$-$C_{20}$-alkynyl, $C_3$-$C_{12}$-cycloalkyl, $C_6$-$C_{20}$-aryl or $C_7$-$C_{20}$-arylalkyl), $C_3$-$C_{12}$-cycloalkyl which contains 1, 2, 3 or 4 heteroatom(s) in the ring moiety, $C_6$-$C_{20}$-heteroaryl, $C_1$-$C_{20}$-haloalkyl, —SiR"$_3$, —OSiR"$_3$, —SR", —PR"$_2$ and —NR"$_2$, wherein each R" is independently a hydrogen or hydrocarbyl, e.g. $C_1$-$C_{20}$-alkyl, $C_2$-$C_{20}$-alkenyl, $C_2$-$C_{20}$-alkynyl, $C_3$-$C_{12}$-cycloalkyl or $C_6$-$C_{20}$-aryl.

More preferably both Cp-ligands are indenyl moieties wherein each indenyl moiety bear one or two substituents as defined above. More preferably each Cp-ligand is an indenyl moiety bearing two substituents as defined above, with the proviso that the substituents are chosen in such are manner that both Cp-ligands are of different chemical structure, i.e both Cp-ligands differ at least in one substituent bonded to the indenyl moiety, in particular differ in the substituent bonded to the five member ring of the indenyl moiety.

Still more preferably both Cp are indenyl moieties wherein the indenyl moieties comprise at least at the five membered ring of the indenyl moiety, more preferably at 2-position, a substituent selected from the group consisting of alkyl, such as $C_1$-$C_6$ alkyl, e.g. methyl, ethyl, isopropyl, and trialkyloxysiloxy, wherein each alkyl is independently selected from $C_1$-$C_6$ alkyl, such as methyl or ethyl, with proviso that the indenyl moieties of both Cp must chemically differ from each other, i.e. the indenyl moieties of both Cp comprise different substituents.

Still more preferred both Cp are indenyl moieties wherein the indenyl moieties comprise at least at the six membered ring of the indenyl moiety, more preferably at 4-position, a substituent selected from the group consisting of a $C_6$-$C_{20}$ aromatic ring moiety, such as phenyl or naphthyl, preferably phenyl, which is optionally substituted with one or more substituents, such as $C_1$-$C_6$ alkyl, and a heteroaromatic ring moiety, with proviso that the indenyl moieties of both Cp must chemically differ from each other, i.e. the indenyl moieties of both Cp comprise different substituents.

Yet more preferably both Cp are indenyl moieties wherein the indenyl moieties comprise at the five membered ring of the indenyl moiety, more preferably at 2-position, a substituent and at the six membered ring of the indenyl moiety, more preferably at 4-position, a further substituent, wherein the substituent of the five membered ring is selected from the group consisting of alkyl, such as $C_1$-$C_6$ alkyl, e.g. methyl, ethyl, isopropyl, and trialkyloxysiloxy, wherein each alkyl is independently selected from $C_1$-$C_6$ alkyl, such as methyl or ethyl, and the further substituent of the six membered ring is selected from the group consisting of a $C_6$-$C_{20}$ aromatic ring moiety, such as phenyl or naphthyl, preferably phenyl, which is optionally substituted with one or more substituents, such as $C_1$-$C_6$ alkyl, and a heteroaromatic ring moiety, with proviso that the indenyl moieties of both Cp must chemically differ from each other, i.e. the indenyl moieties of both Cp comprise different substituents. It is in particular preferred that both Cp are idenyl rings comprising two substituents each and differ in the substituents bonded to the five membered ring of the idenyl rings. Concerning the moiety "R" it is preferred that "R" has the formula (III)

$$-Y(R')_2- \qquad (III)$$

wherein
Y is C, Si or Ge, and
R' is $C_1$ to $C_{20}$ alkyl, $C_6$-$C_{12}$ aryl, or $C_7$-$C_{12}$ arylalkyl.

In case both Cp-ligands of the asymmetric catalyst as defined above, in particular case of two indenyl moieties, are linked with a bridge member R, the bridge member R is typically placed at 1-position. The bridge member R may contain one or more bridge atoms selected from e.g. C, Si and/or Ge, preferably from C and/or Si. One preferable bridge R is —Si(R')$_2$—, wherein R' is selected independently from one or more of e.g. $C_1$-$C_{10}$ alkyl, $C_1$-$C_{20}$ alkyl, such as $C_6$-$C_{12}$ aryl, or $C_7$-$C_{40}$, such as $C_7$-$C_{12}$ arylalkyl, wherein alkyl as such or as part of arylalkyl is preferably $C_1$-$C_6$ alkyl, such as ethyl or methyl, preferably methyl, and aryl is preferably phenyl. The bridge —Si(R')$_2$— is preferably e.g. —Si($C_1$-$C_6$ alkyl)$_2$-, —Si(phenyl)$_2$- or —Si($C_1$-$C_6$ alkyl)(phenyl)-, such as —Si(Me)$_2$-.

In a preferred embodiment the asymmetric catalyst is defined by the formula (IV)

$$(Cp)_2R_1ZrX_2 \quad (IV)$$

wherein
each X is independently a monovalent anionic ligand, such as σ-ligand, in particular halogen
both Cp coordinate to M and are selected from the group consisting of unsubstituted cyclopentadienyl, unsubstituted indenyl, unsubstituted tetrahydroindenyl, unsubstituted fluorenyl, substituted cyclopenadienyl, substituted indenyl, substituted tetrahydroindenyl, and substituted fluorenyl,
with the proviso that both Cp-ligands must chemically differ from each other, and
R is a bridging group linking two ligands L,
wherein R is defined by the formula (V)

$$-Y(R')_2- \quad (V)$$

wherein
Y is C, Si or Ge, and
R' is $C_1$ to $C_{20}$ alkyl, $C_6$-$C_{12}$ aryl, or $C_7$-$C_{12}$ arylalkyl.

More preferably the asymmetric catalyst is defined by the formula (IV), wherein both Cp are selected from the group consisting of substituted cyclopenadienyl, substituted indenyl, substituted tetrahydroindenyl, and substituted fluorenyl.

Yet more preferably the asymmetric catalyst is defined by the formula (IV), wherein both Cp are selected from the group consisting of substituted cyclopentadienyl, substituted indenyl, substituted tetrahydroindenyl, and substituted fluorenyl with the proviso that both Cp-ligands differ in the substituents, i.e. the substituents as defined above, bonded to cyclopentadienyl, indenyl, tetrahydroindenyl, or fluorenyl.

Still more preferably the asymmetric catalyst is defined by the formula (IV), wherein both Cp are indenyl and both indenyl differ in one substituent, i.e. in a substituent as defined above bonded to the five member ring of indenyl.

It is in particular preferred that the asymmetric catalyst is a non-silica supported catalyst as defined above, in particular a metallocene catalyst as defined above.

In a preferred embodiment the asymmetric catalyst is dimethylsilyl[(2-methyl-(4'-tert.butyl)-4-phenyl-indenyl)(2-isopropyl-(4'-tert.butyl)-4-phenyl-indenyl)]zirconium dichloride. More preferred said asymmetric catalyst is not silica supported.

The above described asymmetric catalyst components are prepared according to the methods described in WO 01/48034.

In a preferred embodiment the asymmetric catalyst system is obtained by the emulsion solidification technology as described in WO 03/051934. This document is herewith included in its entirety by reference. Hence in this specific embodiment the asymmetric catalyst is preferably in the form of solid catalyst particles, obtainable by a process comprising the steps of
 a) preparing a solution of one or more asymmetric catalyst components;
 b) dispersing said solution in a solvent immiscible therewith to form an emulsion in which said one or more catalyst components are present in the droplets of the dispersed phase,
 c) solidifying said dispersed phase to convert said droplets to solid particles and optionally recovering said particles to obtain said catalyst.

Preferably a solvent, more preferably an organic solvent, is used to form said solution. Still more preferably the organic solvent is selected from the group consisting of a linear alkane, cyclic alkane, linear alkene, cyclic alkene, aromatic hydrocarbon and halogen-containing hydrocarbon.

Moreover the immiscible solvent forming the continuous phase is an inert solvent, more preferably the immiscible solvent comprises a fluorinated organic solvent and/or a functionalized derivative thereof, still more preferably the immiscible solvent comprises a semi-, highly- or perfluorinated hydrocarbon and/or a functionalized derivative thereof. It is in particular preferred, that said immiscible solvent comprises a perfluorohydrocarbon or a functionalized derivative thereof, preferably $C_3$-$C_{30}$ perfluoroalkanes, -alkenes or -cycloalkanes, more preferred $C_4$-$C_{10}$ perfluoro-alkanes, -alkenes or -cycloalkanes, particularly preferred perfluorohexane, perfluoroheptane, perfluorooctane or perfluoro (methylcyclohexane) or a mixture thereof.

Furthermore it is preferred that the emulsion comprising said continuous phase and said dispersed phase is a bi- or multiphasic system as known in the art. An emulsifier may be used for forming the emulsion. After the formation of the emulsion system, said catalyst is formed in situ from catalyst components in said solution.

In principle, the emulsifying agent may be any suitable agent which contributes to the formation and/or stabilization of the emulsion and which does not have any adverse effect on the catalytic activity of the catalyst. The emulsifying agent may e.g. be a surfactant based on hydrocarbons optionally interrupted with (a) heteroatom(s), preferably halogenated hydrocarbons optionally having a functional group, preferably semi-, highly- or perfluorinated hydrocarbons as known in the art. Alternatively, the emulsifying agent may be prepared during the emulsion preparation, e.g. by reacting a surfactant precursor with a compound of the catalyst solution. Said surfactant precursor may be a halogenated hydrocarbon with at least one functional group, e.g. a highly fluorinated $C_1$ to $C_{30}$ alcohol, which reacts e.g. with a cocatalyst component, such as aluminoxane.

In principle any solidification method can be used for forming the solid particles from the dispersed droplets. According to one preferable embodiment the solidification is effected by a temperature change treatment. Hence the emulsion subjected to gradual temperature change of up to 10° C./min, preferably 0.5 to 6° C./min and more preferably 1 to 5° C./min. Even more preferred the emulsion is subjected to a temperature change of more than 40° C., preferably more than 50° C. within less than 10 seconds, preferably less than 6 seconds.

The recovered particles have preferably an average size range of 5 to 200 μm, more preferably 10 to 100 μm.

Moreover, the form of solidified particles have preferably a spherical shape, a predetermined particles size distribution and a surface area as mentioned above of preferably less than 25 m²/g, still more preferably less than 20 m²/g, yet more preferably less than 15 m²/g, yet still more preferably less than 10 m²/g and most preferably less than 5 m²/g, wherein said particles are obtained by the process as described above.

For further details, embodiments and examples of the continuous and dispersed phase system, emulsion formation method, emulsifying agent and solidification methods reference is made e.g. to the above cited international patent application WO 03/051934.

Preferred as cocatalysts for metallocenes and non-metallocenes, if desired, are the aluminoxanes, in particular the $C_1$-$C_{10}$-alkylaluminoxanes, most particularly methylaluminoxane (MAO). Such aluminoxanes can be used as the sole cocatalyst or together with other cocatalyst(s). Thus besides or in addition to aluminoxanes, other cation complex forming catalysts activators can be used. Said activators are commercially available or can be prepared according to the prior art literature.

Further aluminoxane cocatalysts are described i.a. in WO 94/28034 which is incorporated herein by reference. These are linear or cyclic oligomers of having up to 40, preferably 3 to 20, —(Al(R''')O)— repeat units (wherein R''' is hydrogen, $C_1$-$C_{10}$-alkyl (preferably methyl) or $C_6$-$C_{18}$-aryl or mixtures thereof).

The use and amounts of such activators are within the skills of an expert in the field. As an example, with the boron activators, 5:1 to 1:5, preferably 2:1 to 1:2, such as 1:1, ratio of the transition metal to boron activator may be used. In case of preferred aluminoxanes, such as methylaluminumoxane (MAO), the amount of Al, provided by aluminoxane, can be chosen to provide a molar ratio of Al:transition metal e.g. in the range of 1 to 10 000, suitably 5 to 8000, preferably 10 to 7000, e.g. 100 to 4000, such as 1000 to 3000. Typically in case of solid (heterogeneous) catalyst the ratio is preferably below 500.

The quantity of cocatalyst to be employed in the catalyst of the invention is thus variable, and depends on the conditions and the particular transition metal compound chosen in a manner well known to a person skilled in the art.

Any additional components to be contained in the solution comprising the organotransition compound may be added to said solution before or, alternatively, after the dispersing step.

The intermediate polypropylene is preferably obtainable by a multistage process.

Multistage processes include also bulk/gas phase reactors known as multizone gas phase reactors for producing multimodal propylene polymer. A preferred multistage process is a "loop-gas phase"-process, such as developed by Borealis A/S, Denmark (known as BORSTAR® technology) described e.g. in patent literature, such as in EP 0 887 379 or in WO 92/12182. Multimodal polymers can be produced according to several processes which are described, e.g. in WO 92/12182, EP 0 887 379 and WO 97/22633. A multimodal polypropylene used for the preparation of the inventive foam is preferably produced in a multi-stage process as described in WO 92/12182. The content of this document is incorporated herein by reference. It has previously been known to produce multimodal, in particular bimodal, polypropylene in two or more reactors connected in series, i.e. in different steps (a) and (b). According to the present technology, the main polymerization stages are preferably carried out as a combination of a bulk polymerization/gas phase polymerization. The bulk polymerizations are preferably performed in a so-called loop reactor. In order to produce the polypropylene according to the present invention, a flexible mode is preferred. For this reason, it is preferred that the intermediate polypropylene be produced in two main polymerization stages in a combination of loop reactor/gas phase reactor. Optionally, and preferably, the process may also comprise a prepolymerization step in a manner known in the field and which may precede the polymerization step (a).

The process is preferably a continuous process.

Preferably, in the process for producing the propylene polymer as defined above the conditions for the bulk reactor of step (a) may be as follows: the temperature is within the range of 40° C. to 110° C., preferably between 60° C. and 100° C., 70 to 90° C., the pressure is within the range of 20 bar to 80 bar, preferably between 30 bar to 60 bar, hydrogen can be added for controlling the molar mass in a manner known per se.

Subsequently, the reaction mixture from the bulk (bulk) reactor (step a) is transferred to the gas phase reactor, i.e. to step (b), whereby the conditions in step (b) are preferably as follows: the temperature is within the range of 50° C. to 130° C., preferably between 60° C. and 100° C., the pressure is within the range of 5 bar to 50 bar, preferably between 15 bar to 35 bar, hydrogen can be added for controlling the molar mass in a manner known per se.

The residence time can vary in both reactor zones. In one embodiment of the process for producing the propylene polymer the residence time in the bulk reactor, e.g. loop is in the range 0.5 to 5 hours, e.g. 0.5 to 2 hours and the residence time in the gas phase reactor will generally be 1 to 8 hours.

If desired, the polymerization may be effected in a known manner under supercritical conditions in the bulk, preferably loop reactor, and/or as a condensed mode in the gas phase reactor.

The process of the present technology or any embodiments thereof above enable highly feasible means for producing and further tailoring the propylene polymer composition within the present technology, e.g. the properties of the polymer composition can be adjusted or controlled in a known manner e.g. with one or more of the following process parameters: temperature, hydrogen feed, comonomer feed, propylene feed e.g. in the gas phase reactor, and catalyst system as well as split between components.

The polypropylene composition according to the present invention preferably has a melting temperature Tm in the range of 135 to 165° C., more preferably from 140 to 162° C. and most preferably from 150 to 161° C. High melting temperatures enable the provision of materials capable of withstanding steam sterilization. Higher melting temperatures can be achieved with polypropylene homopolymers and higher crystallinity.

The polypropylene composition according to the present invention preferably includes a polypropylene base resin showing a 2-1 regio-inversion of above 0.1 mol-% when measured by means of 13C-NMR according to the methodology described by J. C. Randall in "Polymer sequence determination $^{13}C$ NMR method", Academic Press 1977. The content of regioinversions is calculated on the basis of the relative concentrations of S(alpha,beta)+S(beta,beta) methylene sequences. Further details are given in the experimental part. The regioinversion mainly can be influenced by catalyst modification.

In yet another aspect, the present invention is concerned with foam containing the polypropylene as described above. Usually the foam comprises at least 95 wt. % of the polypropylene composition of the invention, preferably consists of the polypropylene composition of the invention.

Foaming can be accomplished by chemical and/or physical foaming agents. Appropriate foaming lines are state of the art and described, for example, in S.-T. Lee (edt.), Foam Extrusion Principles and Practice, CRC Press (2000).

Furthermore, the present invention also relates to a process for the preparation of the foam as defined above, wherein a polypropylene composition as described above is subjected to foaming for achieving a foam density from 40 to 600 kg/m$^3$. In such process, a melt of the polypropylene composition and a gaseous foaming agent such as butane, HFC or $CO_2$ is expanded through a pressure drop. Continuous foaming processes as well as discontinuous processes may be applied.

In a continuous foaming process, the polymer is melted and loaded with gas in an extruder under pressures typically above 20 bar before extruded through a die where the pressure drop causes the formation of a foam. The mechanism of foaming polypropylene in foam extrusion is explained, for example, in H. E. Naguib, C. B. Park, N. Reichelt, Fundamental foaming mechanisms governing the volume expansion of extruded polypropylene foams, Journal of Applied Polymer Science, 91, 2661-2668 (2004).

In a discontinuous foaming process, the polymer (micro-) pellets are loaded with foaming agent under pressure and heated below melting temperature before the pressure in the autoclave is suddenly relaxed. The dissolved foaming agent forms bubbles and creates a foam structure. Such preparation of discontinuously foamed beads is described for example in DE 3 539 352.

EXAMPLES

1. Methods
a) Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The MFR$_2$ of polypropylene is determined at a temperature of 230° C. and a load of 2.16 kg.

b) Melting and Crystallisation Temperature

The melting and crystallisation temperature T$_m$ and T$_c$ are determined according to ISO 11357-3 with a TA-Instruments 2920 Dual-Cell with RSC refrigeration apparatus and data station. A heating and cooling rate of 10° C./min is applied in a heat/cool/heat cycle between +23 and +210° C., the crystallisation temperature T$_c$ being determined in the cooling step and the T$_m$ melting temperature being determined in the second heating step.

c) Comonomer Content

Quantitative Fourier transform infrared (FTIR) spectroscopy was used to quantify the amount of comonomer. Calibration was achieved by correlation to comonomer contents determined by quantitative nuclear magnetic resonance (NMR) spectroscopy.

The calibration procedure based on results obtained from quantitative $^{13}$C-NMR spectroscopy was undertaken in the conventional manner well documented in the literature.

The amount of comonomer (N) was determined as weight percent (wt %) via:

$$N=k_1(A/R)+k_2$$

wherein A is the maximum absorbance defined of the comonomer band, R the maximum absorbance defined as peak height of the reference peak and with k$_1$ and k$_2$ the linear constants obtained by calibration. The band used for ethylene content quantification is selected depending if the ethylene content is random (730 cm$^{-1}$) or block-like (720 cm$^{-1}$). The absorbance at 4324 cm$^{-1}$ was used as a reference band.

d) Strain Hardening Factor (SHF)

The strain hardening factor is defined as $$SHF = \frac{\eta_E^+(t,\dot{\epsilon})}{\eta_{LVE}^+(t)} = \frac{\eta_E^+(t,\dot{\epsilon})}{3\eta^+(t)}$$

wherein
$\eta_E^+(t,\dot{\epsilon})$ is the uniaxial extensional viscosity; and $\eta_{LVE}^+(t)$ is three times the time dependent shear viscosity $\eta^+(t)$ in the linear range of deformation. The determination of the linear viscoelastic envelop in extension $\eta_{LVE}^+(t)$, using IRIS Rheo Hub 2008, required the calculation of the discrete relaxation time spectrum from the storage and loss modulus data (G', G" (ω)). The linear viscoelastic data (G', G" (ω)) is obtained by frequency sweep measurements undertaken at 180° C., on a Anton Paar MCR 300 coupled with 25 mm parallel plates. The underlying calculation principles used for the determination of the discrete relaxation spectrum are described in Baumgärtel M, Winter H H, "Determination of the discrete relaxation and retardation time spectra from dynamic mechanical data", Rheol Acta 28:511519 (1989) which is incorporated by reference in its entirety.

IRIS RheoHub 2008 expresses the relaxation time spectrum as a sum of N Maxwell modes $$\overset{o}{G}(t) = G_e \cdot \sum_1^N g_i \cdot e^{-\frac{t}{\lambda_i}}$$

wherein g$_i$ and λ$_i$ are material parameters and G$_e$ is the equilibrium modulus.

The choice for the maximum number of modes, N used for determination of the discrete relaxation spectrum, is done by using the option "optimum" from IRIS RheoHub 2008. The equilibrium modulus G$_e$ was set at zero.

The non-linear fitting used to obtain $\eta_{LVE}^+(t)$ is performed on IRIS Rheo Hub 2008, using the Doi-Edwards model.

The uniaxial extensional viscosity, $\eta_E^+(t,\dot{\epsilon})$ is obtained from uniaxial extensional flow measurements, conducted on an Anton Paar MCR 501 coupled with the Sentmanat extensional fixture (SER-1). The temperature for the uniaxial extensional flow measurements was set at 180° C., applying extension rates dε/dt ranging from 0.3 s$^{-1}$ to 10 s$^{-1}$. and covering a range of Hencky strain $$\epsilon=(l-l_0)/l_0,$$

with l$_o$ being the original and l the actual sample fixation length, from 0.3 to 3.0.

Particularly care was taken for the preparation of the samples for extensional flow. The samples were prepared by compression moulding at 230° C. followed by slow cooling to room temperature (forced water or air cooling were not used). This procedure allowed obtaining well shaped samples free of residual stresses. The sample was left for some minutes at the testing temperature to ensure thermal stability (set temperature ±0.1° C.), before carrying out the uniaxial extensional flow measurements.

e) LAOS Non-linear Viscoelastic Ratio

The investigation of the non-linear viscoelastic behavior under shear flow was done resorting to Large Amplitude Oscillatory Shear. The method requires the application of a sinusoidal strain amplitude, γ$_0$, imposed at a given angular frequency, ω, for a given time, t. Provided that the applied sinusoidal strain is high enough, a non-linear response is generated. The stress, a is in this case a function of the applied strain amplitude, time and the angular frequency. Under these conditions, the non-linear stress response is still a periodic function; however, it can no longer be expressed by a single harmonic sinusoid. The stress resulting from a non-linear viscoelastic response [1-3] can be expressed by a Fourier series, which includes the higher harmonics contributions:

$$\sigma(t,\omega,\gamma_0)=\gamma_0 \cdot \Sigma_n[G'_n(\omega,\gamma_0) \cdot \sin(n\omega t)+G''_n(\omega,\gamma_0) \cdot \cos(n\omega t)]$$

with, σ—stress response
t—time
ω—frequency
γ$_0$—strain amplitude
n—harmonic number
G'$_n$—n order elastic Fourier coefficient
G"$_n$—n order viscous Fourier coefficient The non-linear viscoelastic response was analysed applying Large Amplitude Oscillatory Shear (LAOS). Time sweep measurements were undertaken on an RPA 2000 rheometer from Alpha Technologies coupled with a standard biconical die. During the course of the measurement the test chamber is sealed and a pressure of about 6 MPa is applied. The LAOS test is done applying a temperature of 190° C., an angular frequency of 0.628 rad/s and a strain amplitude of 100 to 1000%, the level of which will affect the result. In order to ensure that steady state conditions are reached, the non-linear response is only determined after at least 20 cycles per measurement are completed.

The Large Amplitude Oscillatory Shear Non-Linear Factor at a strain of n % (LAOS–NLF(n %)) is defined by:

$$LAOS - NLF(n\%) = \left|\frac{G'_1}{G'_3}\right|$$

where $G_1'$—first order Fourier Coefficient
$G_3'$—third order Fourier Coefficient
both coefficients being determined at a strain of n %, the value of n being in the range of 100 to 1000.

More details concerning the measurement are given in
1. J. M. Dealy, K. F. Wissbrun, *Melt Rheology and Its Role in Plastics Processing: Theory and Applications*; edited by Van Nostrand Reinhold, New York (1990)
2. S. Filipe, Non-Linear Rheology of Polymer Melts, AIP Conference
   Proceedings 1152, pp. 168-174 (2009)
3. M. Wilhelm, *Macromol. Mat. Eng.* 287, 83-105 (2002)
4. S. Filipe, K. Hofstadler, K. Klimke, A. T. Tran, Non-Linear Rheological Parameters for Characterisation of Molecular Structural Properties in Polyolefins, Proceedings of *Annual European Rheology Conference*, 135 (2010)
the documents (1) to (4) being incorporated by reference herewith.

f) Rheotens Test

The test described herein follows ISO 16790:2005.

The strain hardening behaviour is determined by the method as described in the article "Rheotens-Mastercurves and Drawability of Polymer Melts", M. H. Wagner, Polymer Engineering and Science, Vol. 36, pages 925 to 935. The content of the document is included by reference. The strain hardening behaviour of polymers is analysed by Rheotens apparatus (product of Göttfert, Siemensstr. 2, 74711 Buchen, Germany) in which a melt strand is elongated by drawing down with a defined acceleration.

The Rheotens experiment simulates industrial spinning and extrusion processes. In principle a melt is pressed or extruded through a round die and the resulting strand is hauled off. The stress on the extrudate is recorded, as a function of melt properties and measuring parameters (especially the ratio between output and haul-off speed, practically a measure for the extension rate). For the results presented below, the materials were extruded with a lab extruder HAAKE Polylab system and a gear pump with cylindrical die (L/D=6.0/2.0 mm). The gear pump was pre-adjusted to a strand extrusion rate of 5 mm/s, and the melt temperature was set to 200° C. The spinline length between die and Rheotens wheels was 80 mm. At the beginning of the experiment, the take-up speed of the Rheotens wheels was adjusted to the velocity of the extruded polymer strand (tensile force zero): Then the experiment was started by slowly increasing the take-up speed of the Rheotens wheels until the polymer filament breaks. The acceleration of the wheels was small enough so that the tensile force was measured under quasi-steady conditions. The acceleration of the melt strand (2) drawn down is 120 mm/sec². The Rheotens was operated in combination with the PC program EXTENS. This is a real-time data-acquisition program, which displays and stores the measured data of tensile force and drawdown speed. The end points of the Rheotens curve (force versus pulley rotary speed) is taken as the melt strength and drawability values.

g) Regioinversion $^{13}$C-NMR spectra were acquired on a DPX-400 spectrometer operating at 100.61 MHz in the Fourier transform mode at 120° C. The samples were dissolved in 1,1,2,2-tetrachloroethane-d2 at 120° C. with a 8% wt/v concentration. Each spectrum was acquired with a 90° pulse, 15 seconds of delay between pulses and CPD (waltzl[omicron]) to remove $^1$H—$^{13}$C coupling. About 3000 transients were stored in 32K data points using a spectral window of 6000 Hz.

h) XHU Gel Level

About 2 g of the polymer ($m_p$) are weighted and put in a mesh of metal which is weighted ($m_{p+m}$). The polymer in the mesh is extracted in a soxhlet apparatus with boiling xylene for 5 hours. The eluent is then replaced by fresh xylene and the boiling is continued for another hour. Subsequently, the mesh is dried and weighted again ($m_{XHU+m}$). The mass of the xylene hot unsolubles $m_m-m_{XHU+m}=m_{XHU}$ is put in relation to the weight of the polymer to obtain the fraction of xylene insolubles $m_{XHU}/m_p$.

2. Compositions:

The intermediate product I1 was produced in a commercial Borstar PP plant in a two-step polymerization process starting in a stirred tank prepolymerization reactor followed by polymerization in a liquid bulk loop reactor, varying the molecular weight by appropriate hydrogen feed. The catalyst used in the polymerization process was a metallocene catalyst as described in example 1 of EP 1741725 A1. The reaction conditions are listed in table 1.

TABLE 1

Reaction conditions in polymerization

| resin | | I1 |
|---|---|---|
| Pre- | Residence time [h] | 0.30 |
| polymerization | Temperature [° C.] | 25 |
| Loop reactor | Temperature [° C.] | 75 |
| | Residence Time [h] | 1.00 |
| | MFR$_2$ [g/10 min] | 0.9 |
| 2,1 regiodefects of mol-% | | 0.4 |

As basis for the comparative examples a reactor powder I2 based on a Ziegler-Natta type Ti catalyst and normally used for producing the commercial PP homopolymer grade BE50 (commercially available from Borealis Polyolefine GmbH, Austria) having an MFR$_2$ of 0.3 g/10 min and no 2,1 regio-defects was used.

Both intermediate products were subjected to a reactive extrusion in the presence of butadiene and peroxide as described in the following. Both the butadiene and the peroxide were pre-mixed with the polymer powder prior to the melt-mixing step in a horizontal mixer with paddle stirrer at a temperature of 65° C., maintaining an average residence time of 15 minutes. The pre-mixture was transferred under inert atmosphere to a co-rotating twin screw extruder of the type Theyson TSK60 having a barrel diameter of 60 mm and an L/D-ratio of 48 equipped with a high intensity mixing screw having three kneading zones and a two-step degassing setup. A melt temperature profile with initial temperature T1=240°

C. in the feed zone, maximum temperature T2=280° C. in the last kneading zone and a final temperature T3=230° C. in the die zone, all temperatures being defined as barrel, was selected. The screw speed was set at 350 rpm.

Following the melt-mixing step, the resulting polymer melt was pelletized in an underwater pelletizer or after solidification of one or more strands in a waterbath in a strand pelletizer at a water temperature of 40° C. Reaction conditions and rheological parameters are summarized in tables 2 (inventive examples) and 3 (comparative examples).

The reactive extrusion was repeated modifying the conditions.

TABLE 2

Reactive modification parameters and characterisation of inventive examples.

|  |  | IE1 | IE2 | IE3 | IE4 |
|---|---|---|---|---|---|
| Reactants and conditions | Peroxide [wt.-%]*** | 0.550 | 0.675 | 0.800 | 0.675 |
|  | Butadiene [wt %] | 1.40 | 1.00 | 1.10 | 0.80 |
|  | Screw speed [rpm] | 350 | 350 | 350 | 400 |
|  | Throughput [kg/h] | 190 | 190 | 190 | 190 |
| Final properties | MFR$_2$ [g/10 min] | 1.8 | 1.8 | 2.0 | 1.9 |
|  | XHU [wt %] | 0.17 | 0.14 | 0.24 | 0.16 |
|  | LAOS-NLF (500%) [—] | 7.0 | 7.3 | 7.3 | 7.2 |
|  | LAOS-NLF (1000%) [—] | 5.9 | 5.8 | 6.0 | 5.7 |
|  | SHF (3/2.5) [—]* | 9.2 | 7.5 | 6.7 | 7.3 |
|  | SHF(1/2.0) [—]** | 4.0 | 5.2 | 6.1 | 4.6 |
|  | F30 melt strength [cN] | 36 | 33 | 35 | 35 |
|  | v30 melt extensibility [mm/s] | 250 | 255 | 258 | 256 |
|  | F200 melt strength [cN] | 22 | 16 | 13 | 13 |
|  | v200 melt extensibility [mm/s] | 252 | 259 | 259 | 260 |

*strain hardening factor (SHF) measured at a strain rate of 3.0 s$^{-1}$ and a Hencky strain of 2.5.
**strain hardening factor (SHF) measured at a strain rate of 1.0 s$^{-1}$ and a Hencky strain of 2.0
***Tert-butylperoxy isopropyl carbonate (CAS No. 2372-21-6) Trigonox ® BPIC-C75 (Akzo Nobel, NL) - 75% solution in mineral spirits; the amount given in Table 2 refers to the total amount of the solution (including the mineral spirits).

TABLE 3

Reactive modification parameters and characterisation of comparative examples.

|  |  | CE1 | CE2 | CE3 | CE4 |
|---|---|---|---|---|---|
| Reactants and conditions | Peroxide [wt.-%]*** | 0.550 | 0.675 | 0.800 | 0.675 |
|  | Butadiene [wt %] | 0.95 | 0.94 | 1.85 | 2.40 |
|  | Screw speed [rpm] | 350 | 350 | 350 | 400 |
|  | Throughput [kg/h] | 190 | 190 | 190 | 190 |
| Final properties | MFR$_2$ [g/10 min] | 1.6 | 2.0 | 2.0 | 2.0 |
|  | XHU [wt %] | 0.38 | 0.27 | 0.45 | 0.86 |
|  | LAOS-NLF (500%) [—] | 6.6 | 6.4 | 6.6 | 6.9 |
|  | LAOS-NLF (1000%) [—] | 5.6 | 5.6 | 5.9 | 6.0 |
|  | SHF (3/2.5) [—]* | 5.6 | 5.9 | 5.7 | 6.2 |
|  | SHF(1/2.0) [—]** | 3.5 | 3.6 | 3.8 | 3.4 |
|  | F30 melt strength [cN] | 36 | 35 | 34 | 32 |
|  | v30 melt extensibility [mm/s] | 243 | 247 | 247 | 252 |
|  | F200 melt strength [cN] | 14 | 10 | 11 | 14 |
|  | v200 melt extensibility [mm/s] | 244 | 248 | 249 | 252 |

*strain hardening factor (SHF) measured at a strain rate of 3.0 s$^{-1}$ and a Hencky strain of 2.5.
**strain hardening factor (SHF) measured at a strain rate of 1.0 s$^{-1}$ and a Hencky strain of 2.0
***Tert-butylperoxy isopropyl carbonate (CAS No. 2372-21-6) Trigonox ® BPIC-C75 (Akzo Nobel, NL) - 75% solution in mineral spirits; the amount given in Table 2 refers to the total amount of the solution (including the mineral spirits).

The invention claimed is:

1. A polypropylene composition comprising a polypropylene base resin, the polypropylene composition having
   a XHU content of 0.10 to 0.30 wt. %;
   a MFR (2.16 kg, 230° C., ISO 1133) of 1.0 to 5.0 g/10 min;
   a F30 melt strength of at least 30 cN, determined in the Rheotens test at 200° C.; and
   a melt extensibility v30 of at least 200 m/s, determined in the Rheotens test at 200° C.; wherein the polypropylene composition does not contain low density polyethylene (LDPE).

2. The polypropylene composition according to claim 1 having an MFR (2.16 kg, 230° C., ISO 1133) of at least 1.0 g/10 min and a LAOS–NLF(500%) of at least 7.0 defined as $$LAOS-NLF(500\%) = \left|\frac{G'_1}{G'_3}\right|$$

where $G_1^{40}$—first order Fourier Coefficient
$G_3^{40}$—third order Fourier Coefficient
with both coefficients being calculated from a measurement performed at 500% strain.

3. The polypropylene composition according to claim 1 wherein polypropylene base resin is present in an amount of at least 96 wt. % with respect to the total polypropylene composition.

4. The polypropylene composition according to claim 1 having a strain hardening factor (SHF) of 6.0 to 12.0 when measured at a strain rate of 3.0 s$^{-1}$ and a Hencky strain of 2.5 and/or a strain hardening factor (SHF) of 3.6 to 8.0 when measured at a strain rate of 1.0 s$^{-1}$ and a Hencky strain of 2.0.

5. The polypropylene composition according to claim 1 having a F30 melt strength of 31 to 60 cN determined at 200° C. in the Rheotens melt strength test.

6. The polypropylene composition according to claim 1 having a F200 melt strength of 8 to 30 cN determined at 200° C. in the Rheotens melt strength test.

7. A polypropylene composition having an MFR (2.16 kg, 230° C., ISO 1133) of 1.0 to 5.0 g/10 min and a xylene hot unsoluble (XHU) content of 0.10 to 0.30 wt. % with respect to the total weight of the polypropylene composition, comprising a polypropylene base resin, the polypropylene base resin being obtained by a process comprising:
   producing an intermediate polypropylene having an MFR (2.16 kg, 230° C., ISO 1133) of 0.5 to 2.5 g/10 min in the presence of an asymmetric catalyst;
   mixing the intermediate polypropylene with 0.3 wt% to 1.0 wt % peroxide and 0.3 wt % to 2.0 wt % butadiene at a temperature of 20 to 90° C. for at least 2 minutes to form a pre-mixed material;
   melt mixing the pre-mixed material in a melt mixing device at a barrel temperature in the range of 180 to 300° C., whereby the melt mixing device is a melt mixing device includes a feed zone, a kneading zone and a die zone, whereby an initial barrel temperature T1 is maintained in the feed zone, a barrel temperature T2 is maintained in the kneading zone and a die barrel temperature T3 is maintained in the die zone, whereby the barrel temperatures T1, T2, and T3 satisfy the following relation: T1<T3<T2.

8. The polypropylene composition according to claim 7 having
   a F30 melt strength of at least 30 cN, determined in the Rheotens test at 200° C.; and
   a melt extensibility v30 of at least 200 m/s, determined in the Rheotens test at 200° C.

9. The polypropylene composition according to claim 7 wherein the polypropylene composition does not contain LDPE.

10. A process for the production of a polypropylene composition having
 a XHU content of 0.10 wt % to 0.30 wt. %;
 a F30 melt strength of at least 30 cN, determined in the Rheotens test at 200° C.; and
 a melt extensibility v30 of at least 200 m/s, determined in the Rheotens test at 200° C.
whereby an asymmetric catalyst derived intermediate polypropylene having an MFR (2.16 kg, 230° C., ISO 1133) of 0.5 to 2.5 g/10 min is mixed with 0.3 wt % to 1.0 wt % peroxide and 0.3 wt % to 2.0 wt % butadiene at a temperature of 20 to 90° C. for at least 2 minutes to form a pre-mixed material; and
 the pre-mixed material is melt mixed in a melt mixing device at a barrel temperature in the range of 180 to 300° C.

11. The process according to claim 10 wherein the melt mixing device includes a feed zone, a kneading zone and a die zone and a specific temperature profile is maintained along the screw of the melt-mixing device, having an initial temperature T1 in the feed zone, a maximum temperature T2 in the kneading zone and a final temperature T3 in the die zone, all temperatures being defined as barrel temperatures and fulfilling the following relation: $T1<T3<T2$.

12. The process according to claim 10 wherein the whole process does not involve visbreaking.

13. Foam comprising the polypropylene composition according to claim 1.

14. The polypropylene composition according to claim 1, having a F200 melt strength of 15 to 23 cN determined at 200° C. in the Rheotens melt strength test.

* * * * *